United States Patent
Seo et al.

(10) Patent No.: US 11,426,665 B2
(45) Date of Patent: *Aug. 30, 2022

(54) METHOD, APPARATUS, COMPUTER PROGRAM AND RECORDING MEDIUM FOR PROVIDING GAME SERVICE

(71) Applicant: LINE Corporation, Tokyo (JP)

(72) Inventors: Dong Pil Seo, Seongnam-si (KR); Sang Hun Jeon, Seongnam-si (KR); Myung Ju Chung, Seongnam-si (KR); Sung Beom Ahn, Seongnam-si (KR); Kwang Hee Han, Seongnam-si (KR); Tae Woo Kim, Seongnam-si (KR); Seong Yeol Lim, Seongnam-si (KR); Joo Hyeon Ryu, Seongnam-si (KR); Sang Min Chung, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,420

(22) Filed: Jan. 26, 2021

(65) Prior Publication Data

US 2021/0146260 A1 May 20, 2021

Related U.S. Application Data

(63) Continuation of application No. 15/867,927, filed on Jan. 11, 2018, now Pat. No. 10,926,181.

(30) Foreign Application Priority Data

Jan. 24, 2017 (KR) .................. 10-2017-0011293

(51) Int. Cl.
*A63F 13/00* (2014.01)
*A63F 9/24* (2006.01)
(Continued)

(52) U.S. Cl.
CPC .............. *A63F 13/75* (2014.09); *A63F 13/25* (2014.09); *A63F 13/30* (2014.09); *A63F 13/35* (2014.09);
(Continued)

(58) Field of Classification Search
CPC .......... A63F 13/25; A63F 13/30; A63F 13/35; A63F 13/67; A63F 13/75; A63F 13/79; G06F 9/445; G06F 9/455; G06N 20/00
See application file for complete search history.

(56) References Cited

U.S. PATENT DOCUMENTS 9,675,874 B1   6/2017  Park
10,926,181 B2 * 2/2021  Seo .................. A63F 13/75
(Continued)

FOREIGN PATENT DOCUMENTS

JP    2006-006473 A    1/2006

OTHER PUBLICATIONS

Japanese Office Action dated Feb. 1, 2022 issued in corresponding Japanese Patent Application No. 2018-003066. English translation has been provided.

*Primary Examiner* — Milap Shah
(74) *Attorney, Agent, or Firm* — Harness, Dickey & Pierce P.L.C.

(57) ABSTRACT

A non-transitory computer-readable recording medium storing instructions that, when executed by a processor, cause the processor a computer to implement a content providing method in conjunction with a computer system may be provided. The content providing method may include providing a game program comprising a game module and a simulation module to a user terminal, the simulation module having same input and output functions as those of the game module, receiving play results comprising first output information of the game module and second output information (Continued)

of the simulation module from the user terminal, the play results are generated by the user terminal while not communicating with a server, and determining whether the a game play at the game module is played fairly based on the first output information of the game module and the second output information of the simulation module.

20 Claims, 6 Drawing Sheets

(51) Int. Cl.
*A63F 13/75* (2014.01)
*A63F 13/79* (2014.01)
*A63F 13/30* (2014.01)
*A63F 13/25* (2014.01)
*G06F 9/455* (2018.01)
*A63F 13/35* (2014.01)
*A63F 13/67* (2014.01)
*G06F 9/445* (2018.01)
*G06N 20/00* (2019.01)

(52) U.S. Cl.
CPC .............. *A63F 13/67* (2014.09); *A63F 13/79* (2014.09); *G06F 9/455* (2013.01); *G06F 9/445* (2013.01); *G06N 20/00* (2019.01)

(56) References Cited

U.S. PATENT DOCUMENTS

| | | |
|---|---|---|
| 2009/0143144 A1 | 6/2009 | Schluessler et al. |
| 2010/0162405 A1 | 6/2010 | Cook et al. |
| 2013/0190071 A1 | 7/2013 | Cahn |
| 2013/0296039 A1 | 11/2013 | Engineer et al. |

\* cited by examiner

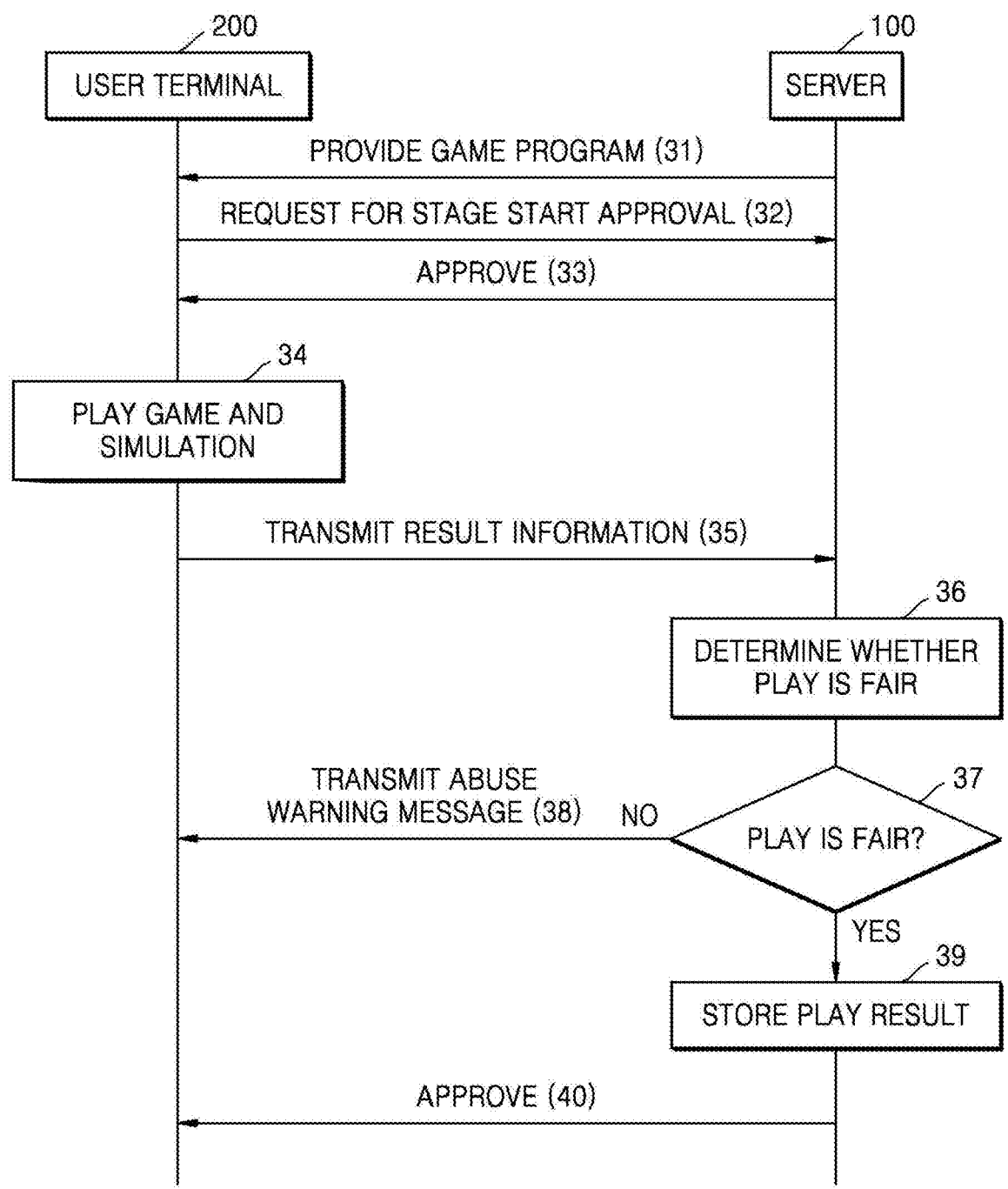

METHOD, APPARATUS, COMPUTER PROGRAM AND RECORDING MEDIUM FOR PROVIDING GAME SERVICE

CROSS-REFERENCE TO RELATED APPLICATION

This application is a continuation of U.S. application Ser. No. 15/867,927, filed on Jan. 11, 2018, which claims priority under 35 U.S.C. § 119 to Korean Patent Application No. 10-2017-0011293 filed on Jan. 24, 2017, in the Korean Intellectual Property Office, the entire contents of each of which are incorporated herein by reference.

BACKGROUND

1. Field

One or more embodiments relate to methods, apparatuses, and/or computer programs for providing a game service.

2. Description of the Related Art

This section provides background information related to the present disclosure, and is not necessarily prior art.

Recently, games played in a mobile environment are increasing. Because a network connection of the mobile environment is unstable compared to a wired network, performing communication in which a server and a terminal communicate after a game is played in one of the server and the terminal is desired rather than performing real time communication in which the server and the terminal communicate with each other while the game is being played. However, when the server and the terminal communicate after the game is played in the terminal, there is a risk of abuse by a user, such as manipulation by the user of a game program of the game installed in the terminal or manipulation by the user while the game is being played.

SUMMARY

This section provides a general summary of the inventive concepts, and is not a comprehensive disclosure of its full scope or all features of the inventive concepts.

One or more example embodiments include a method, apparatus, computer program, and recording medium for providing a game service, which are capable of detecting abuse by a user without creating an excessive load on a server.

Additional aspects will be set forth in part in the description which follows and, in part, will be apparent from the description, or may be learned by practice of the presented example embodiments.

According to one or more example embodiments, a method of providing a game service includes providing a game program including a game module and a simulation module, the simulation module having same input and output functions as those of the game module, receiving, from a user terminal, a play result including output information of the game module with respect to input information and output information of the simulation module with respect to the input information, and determining whether play is fair based on the output information of the game module and the output information of the simulation module.

The method may further include updating user account information based on the play result, according to a result of the determining, and outputting information based on the result of the determining to the user terminal.

In response to a determination that the play is fair, the updating may include updating the user account information based on the output information of the game module, and the outputting may include outputting approval information of the play.

In response to a determination that the play is not fair, the updating may include storing event information indicating that a user is an abusive user in association with the user account information, and the outputting may include outputting an abuse warning message.

The game module may be configured to output first output information in response to first input information, and the simulation module may be configured to output second output information in response to second input information, and the game program may be generated such that the first output information and the second output information are same in response to the first input information and the second input information being same.

The game module may include a graphic element to be displayed on a display of the user terminal and an audio element to be output to a speaker of the user terminal, and the simulation module may not include a graphic element and an audio element.

The game module may be executed on a virtual machine of the user terminal and the simulation module may be executed on a central processing unit of the user terminal.

The game module and the simulation module may be generated using different programming languages.

The method may further include, generating the simulation module via machine learning such that the simulation module has the same input and output functions as the game module by using an input information set and an output information set of the game module before the providing a game program.

According to one or more example embodiments, an apparatus for providing a game service includes a memory having computer-readable instructions stored therein, and at least one processor configured to execute the computer-readable instructions to cause the apparatus to provide a game program, the game program including a game module and a simulation module, the game module and the simulation module being modules having same input and output functions as those of the game module, receive a play result from a user terminal, the play result including output information of the game module with respect to input information and output information of the simulation module with respect to the input information, and determine whether play is fair based on the output information of the game module and the output information of the simulation module.

According to one or more embodiments, a computer program is stored in a medium to execute the above method by using a computer.

According to one or more example embodiments, there is provided a non-transitory computer-readable recording medium having recorded thereon a computer program, which when executed by a computer, is configured to cause the computer to execute the above method.

According to one or more example embodiments, there is provided a non-transitory computer-readable recording medium storing instructions that, when executed by a processor, cause a computer to implement a content providing method. The content providing method includes providing a game program comprising a game module and a simulation module to a user terminal, the simulation module having same input and output functions as those of the game module, receiving play results comprising first output information of the game module and second output information of the simulation module from the user terminal, the play results are generated by the user terminal while not communicating with a server, and determining whether the a game play at the game module is played fairly based on the first output information of the game module and the second output information of the simulation module.

According to one or more example embodiments, an apparatus for providing a game service include a memory having computer-readable instructions stored therein, and at least one processor configured to execute the computer-readable instructions to cause the apparatus to provide a game program including a game module and a simulation module, to a user terminal, the game module and the simulation module being modules having same input and output functions as those of the game module, receive play results from the user terminal after a game play is finished, the play results including first output information of the game module with respect to first input information and second output information of the simulation module with respect to second input information, and determine whether the game play at the game module is played fairly based on the first output information of the game module and the second output information of the simulation module. The play results are generated by the user terminal while not communicating with the apparatus for providing a game service.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 3A is a flowchart of a method of providing a game service, according to an embodiment;

Figure 1:
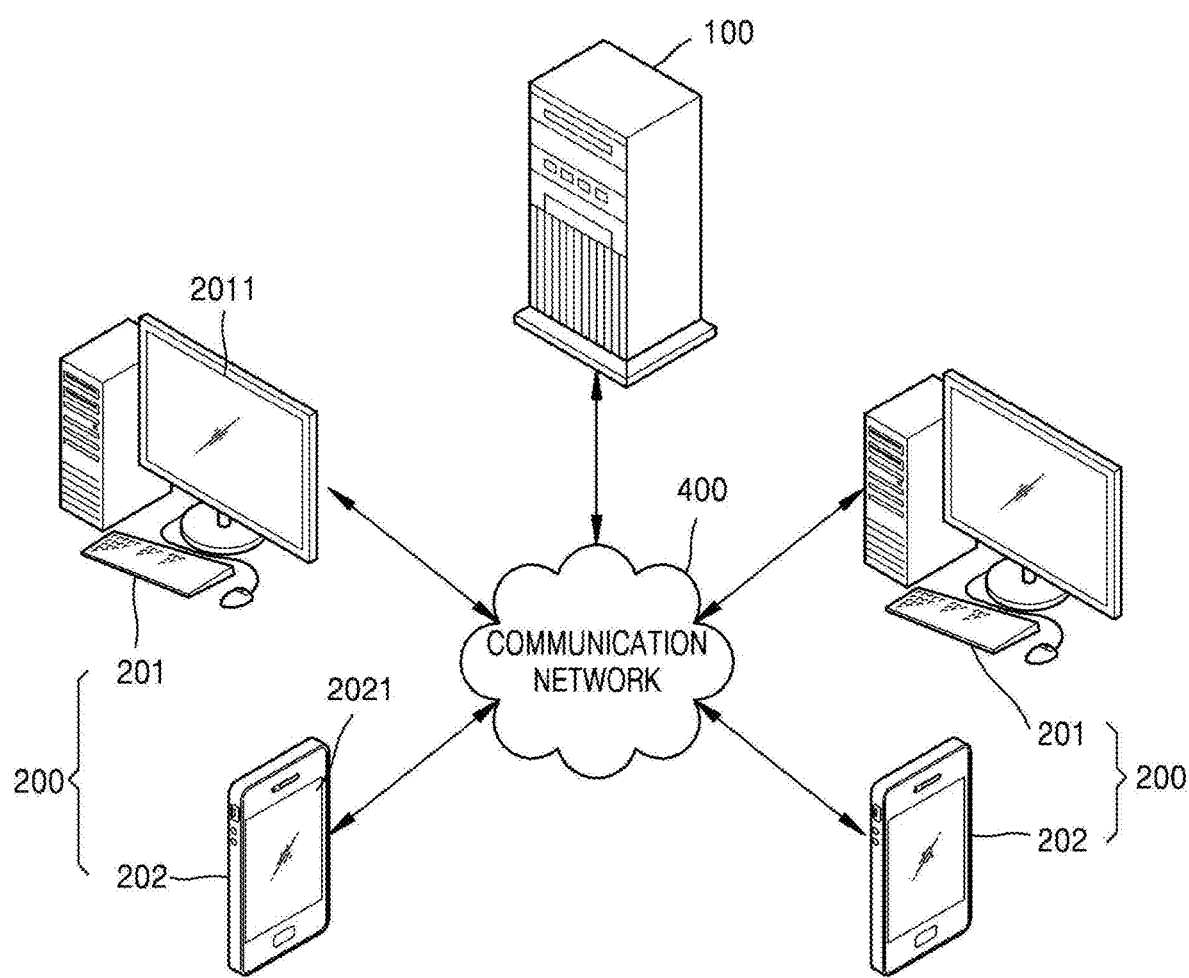
FIG. 1 is a diagram of a configuration of a game system according to an example embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the inventive concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

FIG. 1 is a diagram of a configuration of a game system according to an example embodiment.

Referring to FIG. 1, the game system according to an example embodiment includes a server 100, a user terminal 200, and a communication network 400 connecting the server 100 and the user terminal 200. A plurality of the user terminals 200 may each access the server 100 through the communication network 400.

The game system according to an example embodiment may provide a game program of a game to the user terminal 200, and provide a game service for playing the game as the user terminal 200 accesses the server 100 through the game program. Recently, games played in a mobile environment are increasing. Because a network connection of the mobile environment is unstable compared to a wired network, performing communication in which the server 100 and the user terminal 200 communicate after the game is played in one of the server 100 and the user terminal 200 is desired rather than performing real time communication in which the server 100 and the user terminal 200 communicate with each other while the game is being played. The game system according to an example embodiment provides the game service in which a game result is provided to the server 100 after the game is played autonomously on the user terminal 200 approved by the server 100 (hereinafter referred to as the user terminal 200 playing the game).

The server 100 may provide the game program and the game service capable of detecting abuse by a user during the game, to the user terminal 200. For example, the server 100 may provide the game program to the user terminal 200, and detect the abuse by a user by receiving a result of the game played on the user terminal 200 by using the game program. Although not illustrated, the server 100 according to an example embodiment may include a memory, an input/output unit, a program storage unit, and a controller.

When the game program is first installed in the user terminal 200 and the user terminal 200 plays the game by using the installed game program, abuse of a user may occur, for example, when the user pre-manipulates the game program or manipulates playing of the game by using an illegal program. The game system according to an example embodiment provides the game service capable of detecting such abuses. In this regard, the game system according to an example embodiment may provide a game program including a game module and a simulation module. The user terminal 200 may play the game by using both the game module and the simulation module, and the server 100 may detect abuse by comparing play results of playing the game by using the game and simulation modules. The server 100 may process the play results taking the detected abuse into consideration.

Here, the abuse inclusively denotes an action of using an illegal program (e.g., a bug or hack) on an online game, an action of manipulating the game program, and an action of making unfair profits by stealing an account or logging in via multiple accounts. The abuse usually aims at rewards given based on an outcome or score of the game.

Referring to FIG. 1, the user terminal 200 denotes a communication terminal capable of using a web service in a wired/wireless communication environment. Here, the user terminal 200 may be a personal computer (PC) 201 of the user or a mobile terminal 202 of the user. In FIG. 1, the mobile terminal 202 is a smart phone. However, example embodiments are not limited thereto. The user terminal 200 may be any terminal configured to execute an application capable of performing Internet-based communications, as described above.

The user terminal 200 may include displays 2011 or 2021 displaying a screen, and an input device receiving data from the user. The input device may include, for example, a keyword, a mouse, a track ball, a microphone, a button, or a touch panel, but is not limited thereto.

The communication network 400 connects the user terminal 200 and the server 100 to each other. For example, the communication network 400 may provide an access path for the user terminal 200 to access the server 100 and to transmit and receive packet data to and from the server 100. The communication network 400 may include a wired network (e.g., a local area network (LAN), a wide area network (WAN), a metropolitan area network (MAN), or an integrated service digital network (ISDN)), or a wireless network (e.g., wireless LAN, CDMA, Bluetooth, satellite communication, $3^{rd}$-generation (3G), $4^{th}$-generation (4G), or 5th-generation (5G)), but example embodiments are not limited thereto.

Figure 2A:
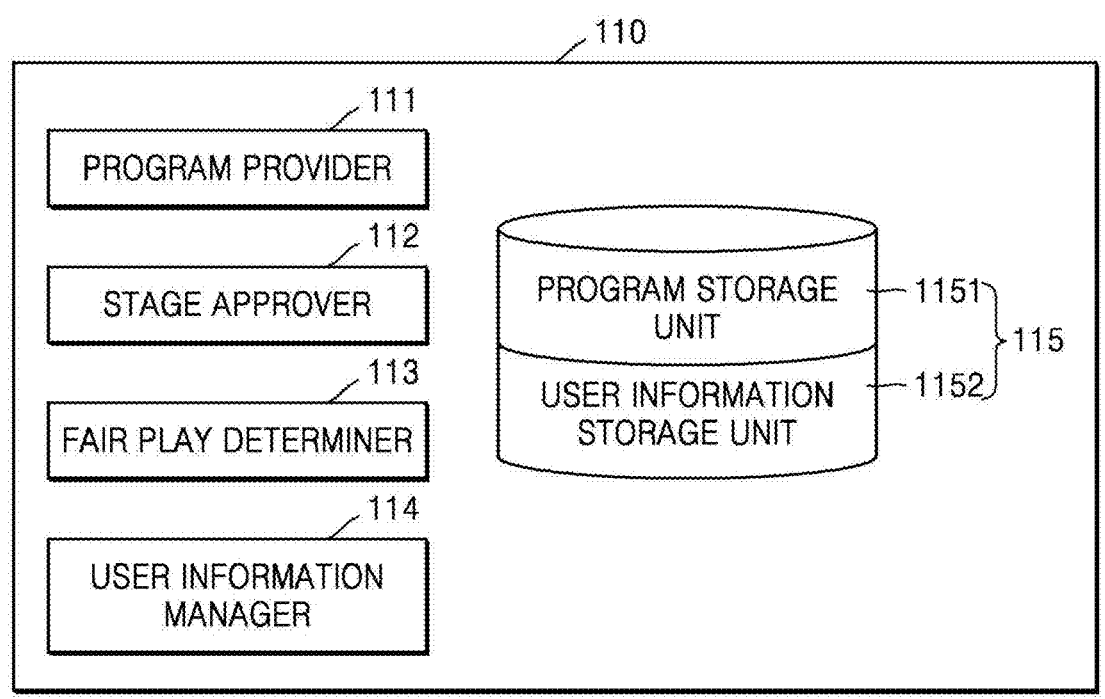
FIG. 2A is a block diagram of a configuration of an apparatus for providing a game service, according to an example embodiment.

FIG. 2A is a block diagram of a configuration of an apparatus 110 for providing a game service, according to an example embodiment.

The apparatus 110 according to an embodiment may correspond to at least one processor or include at least one processor. Accordingly, the apparatus 110 may be driven in a form of being included in another hardware apparatus, such as a microprocessor or a general-purpose computer system, or may be included in the server 100.

FIG. 2A only illustrates components of the apparatus 110 that are related to the present example embodiment so as to prevent features of the present embodiment from being blurred. Accordingly, it would be obvious to one of ordinary skill in the art that the apparatus 110 may further include other general-purpose components in addition to those shown in FIG. 2A.

The apparatus 110 according to an embodiment may provide a game program including a game module and a simulation module to the user terminal 200, approve starting of a stage when the user terminal 200 accesses the apparatus 110 through the game program and requests the apparatus 110 to start the stage, determine whether play is fair by receiving a play result of playing the stage, and perform a process on the play result based on whether the play is fair (e.g., by taking the play results into consideration). Here, the stage is a unit of the game to be played. A user obtains an experience point, an item, mileage, or game money based on the play result.

Referring to FIG. 2A, the apparatus 110 according to an example embodiment includes a program provider 111, a stage approver 112, a fair play determiner 113, a user information manager 114, and a storage unit 115. The apparatus 110 may be implemented by processing circuitry (e.g., one or more processors). Each component of the apparatus 110 will now be described.

The program provider 111 according to an example embodiment may provide a game program including a game module and a simulation module. The simulation module may be generated by the server 100 to have the same input and output functions as the game module. Although the simulation module has the same input and output functions as the game module, the simulation module may have different features from the game module. Here, the same input and output functions mean that the same output value is output when the same input value is input.

According to an example embodiment, the game module may include a graphic element to be displayed on a display of the user terminal 200 and an audio element to be output to a speaker of the user terminal 200, whereas the simulation module may not include a graphic element and an audio element. Accordingly, the game module is generated in relatively high capacity and the simulation module is generated in relatively low capacity.

The game module may be generated by using a particular generating tool to include a graphic element and an audio element, and in this case, the game module may be reconstructed via program code. The simulation module may not be generated by using the above particular generating tool, and may be generated in such a manner that code reconstruction is not possible.

The game module and the simulation mode may be generated by using different programming languages strategically or out of necessity. For example, the game module may be generated using a C+ programming language and the simulation module may be generated using a C or C++ programming language.

Due to a difference between programming languages and/or types of execution files, the game module and the simulation module may be executed in different layers. For example, the game module may be executed in a virtual machine built in the user terminal 200, and the simulation module may be executed in a central processing unit (CPU) of the user terminal 200.

The stage approver 112 according to an example embodiment may receive a game start request from the user terminal 200, and output a game start approval in response to the game start request. Upon receiving the game start approval, the user terminal 200 may start a game. The game start request may include information about a stage selected and to be played by the user terminal 200, account information of a user, and input information including a parameter to be input to the stage. The stage approver 112 may output the game start approval by determining whether the game start request is valid.

The user terminal 200 may complete playing the stage by using the game module, and obtain a play result. Here, the game program is configured such that input information input while the user terminal 200 plays the stage is input to both the game module and the simulation module and thus both the game module and the simulation module are executed. Accordingly, after the stage is played, a play result including both output information of the game module and output information of the simulation module may be obtained.

The input information includes information directly input by the user. For example, a character and an item selected by the user while entering the stage, or a parameter set by the user may correspond to the input information. However, the input information is not limited thereto, and may include information that is not directly input by the user. Examples of such information include parameters (e.g., a user level and/or a rating) unique to a user account desired to play the game.

The fair play determiner 113 according to an example embodiment may receive a play result of the user terminal 200. The play result may include output information of the game module and the output information of the simulation module with respect to the input information. The fair play determiner 113 may determine whether the play is fair based on a result of comparing the output information of the game module and the output information of the simulation module. For example, the fair play determiner 113 may determine that the play is fair when the output information of the game module and the output information of the simulation module are the same, and the play is not fair when the output information of the game module and the output information of the simulation module are different.

Because the game module and the simulation module are generated to have the same input and output functions, the output information of the game module and the output information of the simulation module are the same with respect to the same input information, if there is no abuse by the user. However, when there is abuse by the user, for example, when the user performs a separate process while playing the game by using an illegal program or falsifies the game program, the output information of the game module is changed, and thus the output information of the game module and the output information of the simulation module are different.

The fair play determiner 113 may determine that the play is fair when the output information of the game module and the output information of the simulation module are the same, and the play is not fair when the output information of the game module and the output information of the simulation module are different. Here, the output information of the game module and the output information of the simulation module may be the same, or may be substantially the same within an error range depending on a method of generating the simulation module. For example, when the simulation module is generated via machine learning, the fair play determiner 113 may determine that the play is fair when the output information of the game module and the output information of the simulation module are the same, and determine that the play is not fair when the output information of the game module and the output information of the simulation module are outside the error range. The fair play determiner 113 may output a result of determining whether the play is fair to the user information manager 114.

Meanwhile, the apparatus 110 and the user terminal 200 may not separately communicate from when the stage approver 112 outputs the game start approval to when the fair play determiner 113 receives the play result. Accordingly, the apparatus 110 and the user terminal 200 communicate with each other once when the play starts and once when the play ends, and the game is played only in the user terminal 200 and the apparatus 110 and the user terminal 200 do not communicate with each other in real-time while the game is being played. Thus, the game can be stably played on the user terminal 200 even in an unstable communication environment.

The user information manager 114 according to an example embodiment may update and store user account information based on the play result, according to the result of determining whether the play is fair by the fair play determiner 113. When the fair play determiner 113 determines that the play is fair, the user information manager 114 may store the output information of the game module. The user information manager 114 may update the user account information based on the output information of the game module. When the fair play determiner 113 determines that the play is not fair, the user information manager 114 may store event information indicating that the user is an abusive user in association with the user account information.

The user information manager 114 may output information according to the result of the determining to the user terminal 200. For example, when the fair play determiner 113 determines that the play is fair, the user information manager 114 may output approval information of the play. When the fair play determiner 113 determines that the play is not fair, the user information manager 114 may output an abuse warning message to the user terminal 200. The abuse warning message may be, for example, "play is not fair and thus play result is not reflected". When the fair play determiner 113 determines that the play is not fair, the user information manager 114 may not only output the abuse warning message, but also may impose a penalty on an account of the abusive user.

The storage unit 115 according to an example embodiment includes a program storage unit 1151 storing the game program, and a user information storage unit 1152 storing the user account information. The game program of a recent version is stored in the program storage unit 1151, and the program provider 111 may provide the game program stored in the program storage unit 1151 to the user terminal 200. The user information storage unit 1152 may store information related to a user account. For example, the user information storage unit 1152 may store, for example, the user account information, game item information included in the user account, and/or abuse information of the user account.

Figure 2B:
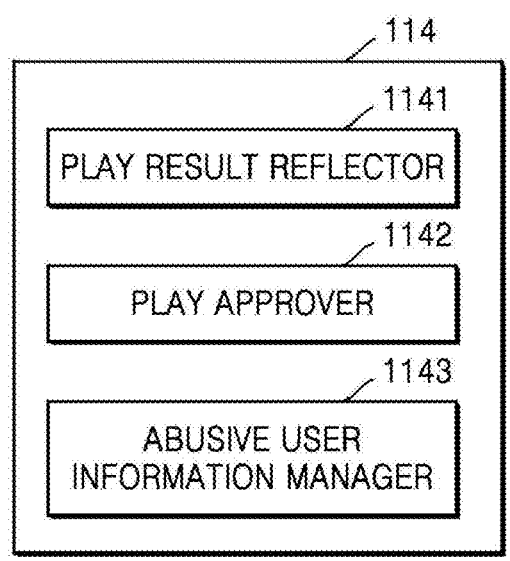
FIG. 2B is a block diagram of a configuration of a user information manager of FIG. 2A.

FIG. 2B is a block diagram of a configuration of the user information manager 114 of FIG. 2A.

Referring to FIG. 2B, the user information manager 114 according to an example embodiment includes a play result reflector 1141, a play approver 1142, and an abusive user information manager 1143. When the play is fair, the play approver 1142 may transmit approval information indicating that the play result is approved to the user terminal 200. The user terminal 200 may be in a standby mode after transmitting the play result to the server 100, and then proceed to a next step when the approval information is received.

When the play is fair, the play result reflector 1141 may store the play result in the user information storage unit 1152. For example, an experience point, game money, and an item associated with the user account may be updated based on acquisition information of an experience point, game money, and an item, which is the output information of the game module.

When the play is not fair, the abusive user information manager 1143 may store the event information indicating that the user is an abusive user in association with the user account information. The abusive user information manager 1143 may impose a penalty on the user account stored as the abusive user. The penalty may be pre-set and applied gradationally or proportionally based on the number of times abuse occurs. For example, gradational (or proportional) penalties (e.g., access prohibition, character deletion, and/or an account deletion) may be set and applied during a pre-set (or alternatively, desired) period of time. The abusive user information manager 1143 may output the abuse warning message to the user terminal 200.

Figure 2C:
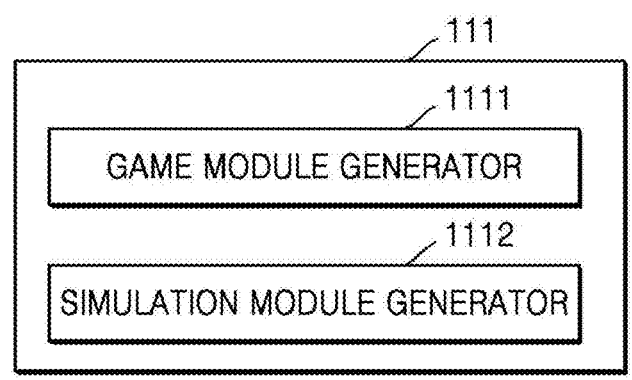
FIG. 2C is a block diagram of a configuration of a program provider of FIG. 2A.

FIG. 2C is a block diagram of a configuration of the program provider 111 of FIG. 2A.

Referring to FIG. 2C, the program provider 111 according to an example embodiment includes a game module generator 1111 and a simulation module generator 1112.

According to an example embodiment, the game module is first generated by the game module generator 1111. The game module generator 1111 may autonomously provide a game module generating tool to a developer, and generate the game module by receiving an input of the developer. In some example embodiments, the game module generator 1111 may receive the game module generated by the developer by using a separate tool. The game module generator 1111 may store the game module in the program storage unit 1151.

Then, the simulation module generator 1112 may generate the simulation module based on the game module. The simulation module generator 1112 may generate the simulation module such that the simulation module has the same input and output functions as the game module. However, the simulation module does not need to include each and every logic of the game module, and it is sufficient to just include the same input-output functions as the game module. For example, when the game module outputs first output information when first input information is input, and the simulation module outputs second output information when second input information is input, the simulation module generator 1112 may generate the simulation module such that the first output information and the second output information are the same when the first input information and the second input information are the same.

The simulation module generator 1112 may generate the simulation module via a machine learning or deep learning method, but example embodiments are not limited thereto. A detailed method of generating the simulation module by using the machine learning or deep learning method will be described later with reference to FIG. 3B.

FIG. 3A is a flowchart of a method of providing a game service, according to an example embodiment.

The method of FIG. 3A includes operations that are performed in time-series by the apparatus 110 of FIGS. 2A through 2C. Accordingly, details described with reference to FIGS. 2A through 2C may be applied to the method of FIG. 3A even if omitted.

Referring to FIG. 3A, the server 100 may provide a game program to the user terminal 200 in operation 31. The game program may include a game module and a simulation module that are generated to have the same input and output functions as the game module. The game module may be generated to output first output information when first input information is input, the simulation module may be generated to output second output information when second input information is input, and the game program may be generated such that the first output information and the second output information are the same when the first input information and the second input information are the same. The game module may include a graphic element to be displayed on a display of a user terminal and an audio element to be output to a speaker of the user terminal, and the simulation module may not include such graphic element and audio element. The game module may be generated such that code reconstruction is possible, and the simulation module may be generated such that code reconstruction is not possible. The game module may be executed on a virtual machine of the user terminal, and the simulation module may be executed on a CPU of the user terminal. The game module and the simulation module may be generated using different programming languages. The game module may be generated using a C+ programming language, and the simulation module may be generated using a C or C++ programming language.

In operation 32, the user terminal 200 may request the server 100 for a stage start approval. In operation 33, the server 100 may transmit the stage start approval to the user terminal 200. In operation 34, the user terminal 200 may autonomously play a game and a simulation.

In operation 35, the user terminal 200 may transmit a play result including information about results of playing the game and the simulation. The play result includes output information of the game module according to input information and output information of the simulation module according to the input information.

Between operations 33 to 35, for example in operation 34, the user terminal 200 and the server 100 may not communicate each other, and the user terminal 200 may autonomously play the game and the simulation.

In operation 36, the server 100 determines whether play of the user terminal 200 is fair based on the play result received in operation 35. It is determined whether the play is fair in operation 36 by comparing the output information of the game module and the output information of the simulation module.

When it is determined that the play is fair in operation 37, the server 100 may perform operation 39, and when it is determined that the play is not fair in operation 37, it is determined that abuse occurs and the server 100 may perform operation 38. Although not shown in FIG. 3A, when it is determined that the play is not fair in operation 37, the server 100 may store event information indicating that a user is an abusive user in association with user account information.

In operation 38, the server 100 may transmit an abuse warning message to the user terminal 200. In operation 39, the server 100 may store a play result. In operation 39, the server 100 may update and store the user account information based on based on the play result, for example, the output information of the game module. In operation 40, the server 100 may transmit approval of the play result to the user terminal 200.

Figure 3B:
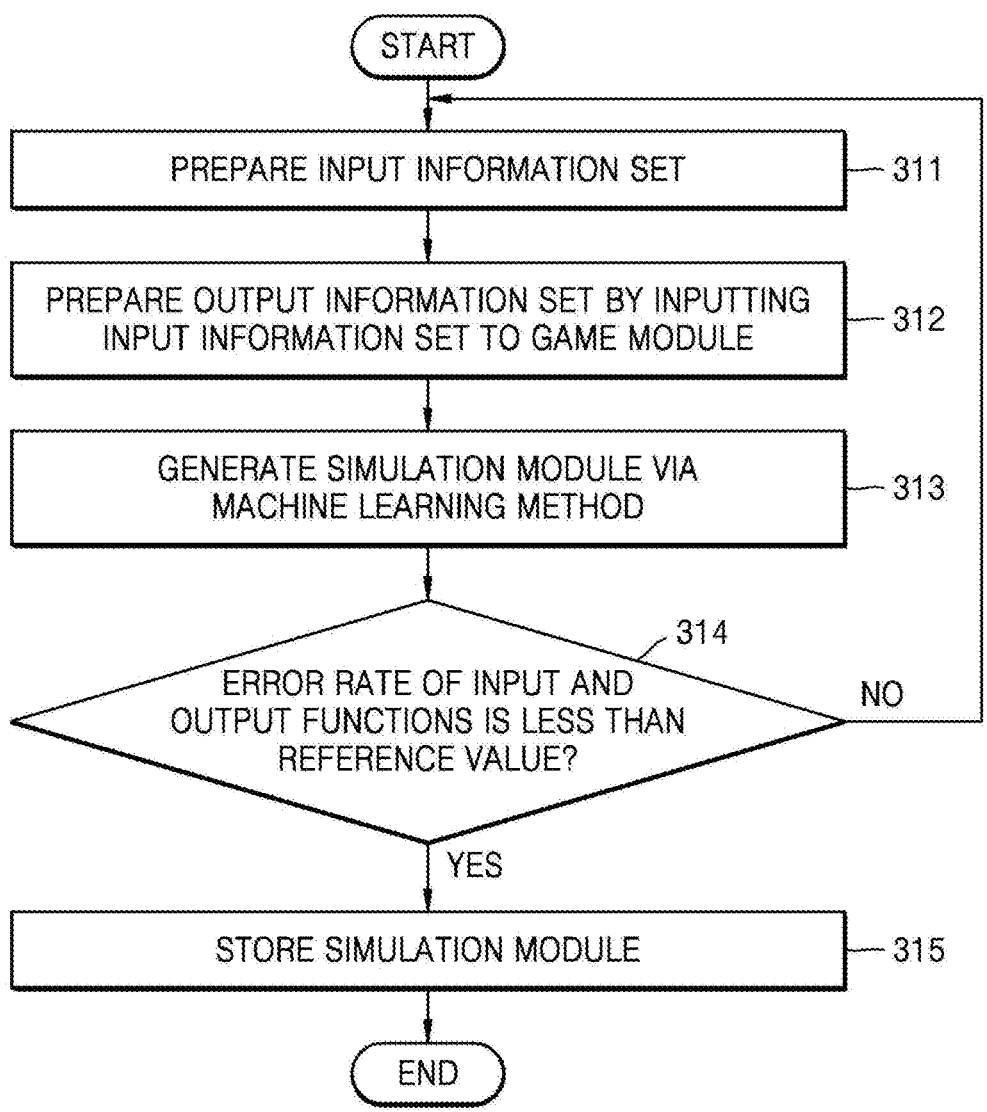
FIG. 3B is a flowchart of a method of generating, by a simulation module generator of FIG. 2C, a simulation module by using a machine learning or deep learning method, according to an example embodiment.

FIG. 3B is a flowchart of a method of generating, by the simulation module generator 1112 of FIG. 2C, a simulation module by using a machine learning or deep learning method, according to an example embodiment. Referring to FIG. 3B, the simulation module may be generated via learning such as to have the same input and output functions as a game module by using input information and output information sets of the game module.

Referring to FIG. 3B, the simulation module generator 1112 may prepare the input information set in operation 311, and prepare the output information set including the output information with respect to input information, by inputting the input information set to the game module, in operation 312. Pieces of input information included in the input information set match pieces of output information included in the output information set in a one-to-one manner. In operation 313, the simulation module generator 1112 may generate the simulation module by using the machine learning method with respect to the input information set and the output information set. For example, the deep learning method may be used. The simulation module generator 1112 may generate the simulation module that is capable of deriving the output information set from the input information set, by using the deep learning method. The simulation module may be more elaborately generated when more pieces of input and output information are included in the input and output information sets.

In operation 314, the simulation module generator 1112 may determine whether an error rate between input and output functions of the game module and input and output functions of the simulation module is less than a reference value. For example, when an error rate between output information of the game module and the output information of the simulation module with respect to arbitrary input information is less than the reference value, (e.g., when same output information is output within an error range), operation 315 may be performed. When it is determined that the error rate of the input and output functions is equal to or greater than the reference value in operation 314, operation 311 may be performed such that the simulation module is further trained, and the training may be repeated based on the simulation module that has been generated. As the training is repeated, the simulation module may be more elaborately generated via more input and output information sets, and thus the error rate between the input and output functions of the game module and the input and output functions of the simulation module may be reduced.

In operation 315, the simulation module generator 1112 may store the generated simulation module in the program storage unit 1151, and end the method.

Figure 4:
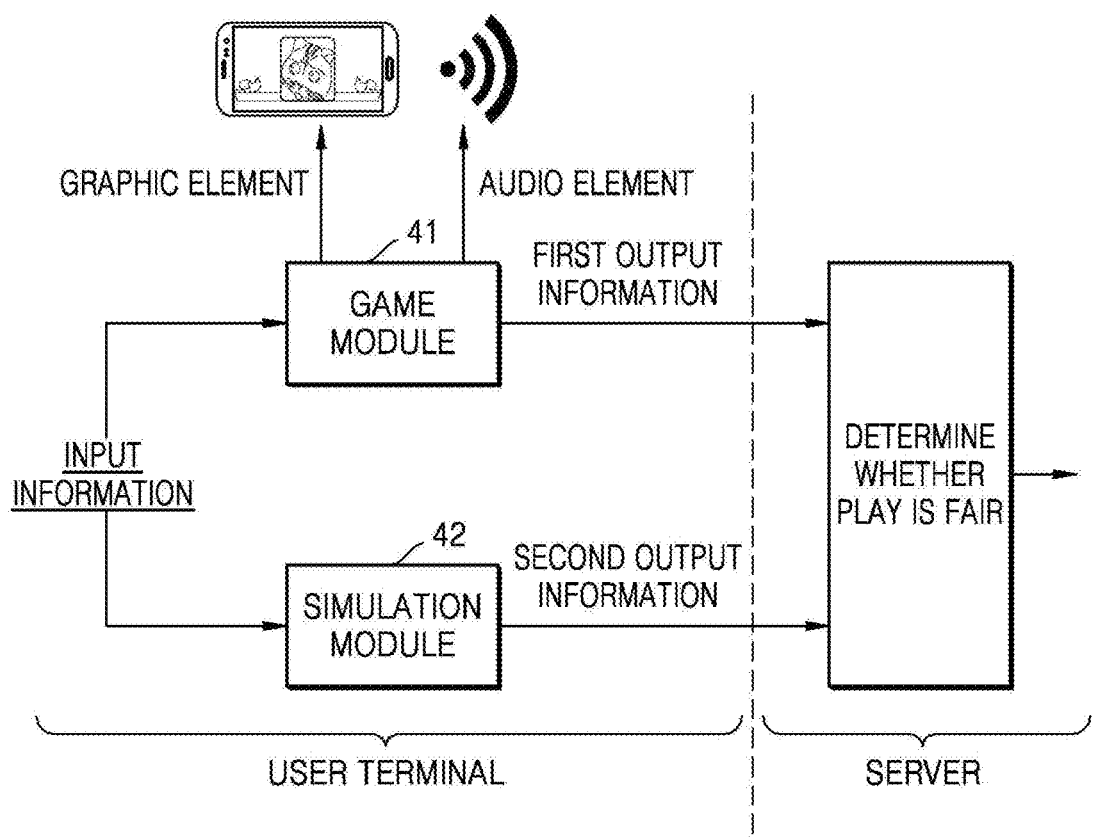
FIG. 4 is a diagram for describing a game system according to an example embodiment.

FIG. 4 is a diagram for describing a game system according to an example embodiment.

Referring to FIG. 4, a game module 41 and a simulation module 42 are installed in the user terminal. A user may select a stage to be played in a game, set various parameters, and request for a stage start approval. When the stage start approval is received from the server, input information may be identically input to the game module 41 and the simulation module 42. Here, the input information may include the various parameters set by the user. For example, the various parameters include information about a character selected to play the stage, a status of the character, and an item selected to be used in the stage.

As shown in FIG. 4, the game module 41 and the simulation module 42 are installed in the user terminal 200 and are independent of the server 100.

The game module 41 may play the stage by using the input information and outputs a graphic element and an audio element through a display and a speaker of the user terminal 200. When the stage is ended, first output information about a play result of playing the stage is output. The stage is played according to a logic included in the game module 41.

The simulation module 42 may output second output information according to a logic included in the simulation module 42, by using the same input information as that input information to the game module 41. The simulation module 42 may be generated not to include a graphic element and an audio element, and to only include the logic.

The first output information and the second output information may be transmitted from the user terminal 200 to the server 100, and the server 100 may determine whether play is fair by using the first output information and the second output information.

A simulation module for determining fairness of a game module needs to be thoroughly secured from hacking or abuse of a user. When the server 100 includes the simulation module, accessibility of the user is low and thus security of the simulation module may be high, but in such case the server 100 may be overloaded because all simulations of plays of the user are performed by the server 100.

In this regard, a game system according to an example embodiment may execute a simulation in the user terminal 200 instead of the server 100, while generating a simulation module to have high security such that the simulation module is safe from hacking or abuse of a user. Accordingly, a load of the server 100 may be reduced while safety from hacking or abuse of the user is guaranteed or improved.

According to one or more example embodiments, methods, apparatuses, computer programs, and recording media for providing a game service may detect abuse of a user without creating an excessive load on a server.

It should be understood that the example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A non-transitory computer-readable recording medium storing instructions that, when executed by a processor, cause a computer to implement a content providing method, the content providing method comprising:
   providing a game program comprising a game module and a simulation module to a user terminal to cause the user terminal to autonomously play a game play and a simulation, the simulation module having same input and output functions as those of the game module;
   receiving play results comprising first output information of the game module and second output information of the simulation module from the user terminal, the first output information and the second output information generated by the user terminal while the user terminal being not in communication with a server; and
   determining whether the game play at the game module is played fairly based on the first output information of the game module and the second output information of the simulation module.

2. The non-transitory computer-readable recording medium according to claim 1, wherein the content providing method further comprises:
   updating user account information based on the play results, according to a result of the determining; and
   outputting information based on the result of the determining to the user terminal.

3. The non-transitory computer-readable recording medium according to claim 2, wherein in response to the result of the determining indicating that the game play at the game module is played fairly,
   the updating comprises updating the user account information based on the first output information of the game module, and
   the outputting comprises outputting approval information of the game play.

4. The non-transitory computer-readable recording medium according to claim 2, wherein in response to the result of the determining indicating that the game play at the game module is not played fairly,
   the updating comprises storing event information indicating that a user is an abusive user in association with the user account information, and
   the outputting comprises outputting an abuse warning message.

5. The non-transitory computer-readable recording medium according to claim 1, wherein
   the game module is configured to output first output information when first input information is input, and the simulation module is configured to output second output information when second input information is input, and
   the game program is generated such that the first output information and the second output information are the same when the first input information and the second input information are the same.

6. The non-transitory computer-readable recording medium according to claim 1, wherein
   the game module comprises a graphic element to be displayed on a display of the user terminal and an audio element to be output to a speaker of the user terminal, and
   the simulation module does not comprise a graphic element and an audio element.

7. The non-transitory computer-readable recording medium according to claim 1, wherein the game module is executed on a virtual machine of the user terminal and the simulation module is executed on a central processing unit of the user terminal.

8. The non-transitory computer-readable recording medium according to claim 1, wherein the game module and the simulation module are generated using different programming languages.

9. The non-transitory computer-readable recording medium according to claim 1, wherein the content providing method further comprises generating the simulation module via machine learning such that the simulation module has the same input and output functions as the game module, by using an input information set and an output information set of the game module before the providing of the game program.

10. The non-transitory computer-readable recording medium according to claim 1, wherein
    the content providing method further comprises generating the simulation module via machine learning such that the simulation module does not include each and every logic of the game module, by using an input information set and an output information set of the game module before providing the game program.

11. An apparatus for providing a game service, the apparatus comprising:
    a memory having computer-readable instructions stored therein; and
    at least one processor configured to execute the computer-readable instructions to cause the apparatus to,
    provide a game program including a game module and a simulation module to a user terminal to cause the user terminal to autonomously play a game play and a simulation, the game module and the simulation module being modules having same input and output functions as those of the game module,
    receive play results from the user terminal after the game play is finished, the play results including first output information of the game module with respect to first input information and second output information of the simulation module with respect to second input information, and determine whether the game play at the game module is played fairly based on the first output information of the game module and the second output information of the simulation module, wherein the first output information and the second output information is generated by the user terminal while the user terminal is not in communication with the apparatus for providing the game service.

12. The apparatus of claim 11, wherein the at least one processor is further configured to execute the computer-readable instructions to cause the apparatus to, update user account information based on the play results, according to a result of the determination, and output information based on the result of the determination to the user terminal.

13. The apparatus of claim 12, wherein in response to the result of the determination indicating that the game play at the game module is played fairly, the at least one processor is further configured to execute the computer-readable instructions to cause the apparatus to, update the user account information based on the first output information of the game module, and output approval information of the game play.

14. The apparatus of claim 12, wherein in response to the result of the determination indicating that the game play at the game module is not played fairly, the at least one processor is further configured to execute the computer-readable instructions to cause the apparatus to, store event information indicating that a user is an abusive user in association with the user account information, and output an abuse warning message.

15. The apparatus of claim 11, wherein the game module is configured to output first output information when first input information is input, and the simulation module is configured to output second output information when second input information is input, and the game program is generated such that the first output information and the second output information are the same when the first input information and the second input information are the same.

16. The apparatus of claim 11, wherein the game module comprises a graphic element to be displayed on a display of the user terminal and an audio element to be output to a speaker of the user terminal, and the simulation module does not comprise a graphic element and an audio element.

17. The apparatus of claim 11, wherein the game module is executed on a virtual machine of the user terminal and the simulation module is executed on a central processing unit of the user terminal.

18. The apparatus of claim 11, wherein the game module and the simulation module are generated using different programming languages.

19. The apparatus of claim 11, wherein the at least one processor is further configured to generate the simulation module via machine learning such that the simulation module has the same input and output functions as the game module, by using an input information set and an output information set of the game module.

20. The apparatus of claim 11, wherein the at least one processor is further configured to generate the simulation module via machine learning such that the simulation module does not include each and every logic of the game module, by using an input information set and an output information set of the game module before providing the game program.

* * * * *